United States Patent
Wiesenburger (12) 
(10) Patent No.: US 7,128,007 B1
(45) Date of Patent: Oct. 31, 2006

(54) LIQUID FERTILIZER APPLICATION SYSTEM

(76) Inventor: Brent W. Wiesenburger, 403 N. 1st St., Aberdeen, SD (US) 57401

( * ) Notice: Subject to any disclaimer, the term of this patent is extended or adjusted under 35 U.S.C. 154(b) by 0 days.

(21) Appl. No.: 11/208,326

(22) Filed: Aug. 19, 2005

(51) Int. Cl.
*A01C 23/00* (2006.01)

(52) U.S. Cl. ..................................................... 111/121

(58) Field of Classification Search ................ 111/127, 111/170, 174, 118, 119, 121, 120
See application file for complete search history.

(56) References Cited

U.S. PATENT DOCUMENTS

| | | | |
|---|---|---|---|
| 1,302,428 A * | 4/1919 | Pereda | 406/65 |
| 2,874,878 A * | 2/1959 | Sigmund | 222/624 |
| 2,912,944 A | 11/1959 | Snow et al. | 111/7 |
| 3,207,389 A | 9/1965 | Beebe et al. | 222/486 |
| 3,319,589 A | 5/1967 | Moran | 111/7 |
| 3,632,043 A | 1/1972 | Kirshmann et al. | 239/146 |
| 3,653,550 A | 4/1972 | Williams | 222/136 |
| 4,224,882 A * | 9/1980 | Cruse | 111/120 |
| 4,628,840 A | 12/1986 | Jacobson | 111/7 |
| 4,656,957 A | 4/1987 | Williamson et al. | 111/7 |
| 4,947,770 A | 8/1990 | Johnston | 111/121 |
| 4,998,488 A | 3/1991 | Hansson | 111/187 |
| 5,027,724 A | 7/1991 | Ptacek et al. | 111/121 |
| 5,269,237 A | 12/1993 | Baker et al. | 111/121 |
| 5,370,068 A | 12/1994 | Rawson et al. | 111/121 |
| 5,461,994 A | 10/1995 | Zimmerman | 111/121 |
| 5,477,792 A | 12/1995 | Bassett et al. | 111/121 |
| 5,622,124 A | 4/1997 | Smith et al. | 111/121 |
| 5,862,763 A | 1/1999 | Dietrich, Sr. | 111/121 |
| 6,006,684 A | 12/1999 | Whalen et al. | 111/121 |
| 6,095,065 A | 8/2000 | Dietrich, Sr. | 111/121 |
| 6,289,829 B1 | 9/2001 | Fish et al. | 111/121 |
| 6,363,870 B1 | 4/2002 | King | 111/121 |

* cited by examiner

*Primary Examiner*—Christopher J. Novosad (57) ABSTRACT

A liquid fertilizer application system for efficiently dispensing and placing liquid fertilizer within a furrow to minimize germination injury. The liquid fertilizer application system includes a fertilizer tube having an input opening and a discharge opening, a mounting tab and a centering bracket. The fertilizer tube is attached to a shank of a planter implement using the mounting tab and is additionally positioned by the centering bracket. The discharge opening of the fertilizer tube is located in front of a scraper attached to the planter implement seed tube. The discharge opening of the fertilizer tube is forward of the seed tube to allows for the application of the fertilizer into a prepared furrow prior to placement of the seed.

18 Claims, 7 Drawing Sheets

LIQUID FERTILIZER APPLICATION SYSTEM

CROSS REFERENCE TO RELATED APPLICATIONS

A related application is being filed concurrently with or approximately the same date with Ser. No. 11/207,984 entitled Liquid Fertilizer Application System.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to fertilizer applicators and more specifically it relates to a liquid fertilizer application system for efficiently dispensing and placing liquid fertilizer within a furrow to minimize germination injury.

2. Description of the Related Art

Any discussion of the prior art throughout the specification should in no way be considered as an admission that such prior art is widely known or forms part of common general knowledge in the field.

Fertilizer applicators have been in use for years. Typically, the placement of fertilizer in close proximity to seeds during the planting process is done to improve crop yields. Current applicators place fertilizer to the side of the seeds in the furrows, on top of the seeds in the furrows, in bands on the soil near the seed rows or broadcast on the soil above the seed rows. Unfortunately, current fertilizer applicators utilized in the farming industry directly apply fertilizer to the seed which results in burning of the seed thereby increasing germination injury.

While these devices may be suitable for the particular purpose to which they address, they are not as suitable for efficiently dispensing and placing liquid fertilizer within a furrow to minimize germination injury. Conventional fertilizer applicators tend to directly apply the fertilizer upon the seed thereby increasing germination injury.

In these respects, the liquid fertilizer application system according to the present invention substantially departs from the conventional concepts and designs of the prior art, and in so doing provides an apparatus primarily developed for the purpose of efficiently dispensing and placing liquid fertilizer within a furrow to minimize germination injury.

BRIEF SUMMARY OF THE INVENTION

In view of the foregoing disadvantages inherent in the known types of fertilizer applicators now present in the prior art, the present invention provides a new liquid fertilizer application system construction wherein the same can be utilized for efficiently dispensing and placing liquid fertilizer within a furrow to minimize germination injury.

The general purpose of the present invention, which will be described subsequently in greater detail, is to provide a new liquid fertilizer application system that has many of the advantages of the fertilizer applicators mentioned heretofore and many novel features that result in a new liquid fertilizer application system which is not anticipated, rendered obvious, suggested, or even implied by any of the prior art fertilizer applicators, either alone or in any combination thereof.

To attain this, the present invention generally comprises a fertilizer tube having an input opening and a discharge opening, a mounting tab and a centering bracket. The fertilizer tube is attached to a shank of a planter implement using the mounting tab and is additionally positioned by the centering bracket. The discharge opening of the fertilizer tube is located in front of a scraper attached to the planter implement seed tube. The discharge opening of the fertilizer tube is forward of the seed tube to allows for the application of the fertilizer into a prepared furrow prior to placement of the seed.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a liquid fertilizer application system that will overcome the shortcomings of the prior art devices.

A second object is to provide a liquid fertilizer application system for efficiently dispensing and placing liquid fertilizer within a furrow to minimize germination injury.

Another object is to provide a liquid fertilizer application system that increases crop yield.

An additional object is to provide a liquid fertilizer application system that reduces fertilizer usage.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1 through 7 illustrate a liquid fertilizer application system 10, which comprises a liquid fertilizer application system for efficiently dispensing and placing liquid fertilizer 12 within a furrow 16 to minimize germination injury. The liquid fertilizer application system 10 includes a fertilizer tube 20 having an input opening 21 and a discharge opening 23, a mounting tab 30 and a centering bracket 40. The fertilizer tube 20 is attached to the shank 15 of a planter implement using the mounting tab 30 and is additionally positioned by the centering bracket 40. The discharge opening 23 of the fertilizer tube 20 is located in front of a scraper 13 attached to the planter implement shank 15. The discharge opening 23 of the fertilizer tube 20 is forward of the seed tube 17 to allow for the application of the fertilizer 12 into a prepared furrow 16 prior to placement of the seed 14.

B. Fertilizer Tube

The fertilizer tube 20 is preferably made of a rigid material that will not significantly distort when welded to or when assembled onto the shank 15 of a planter implement. The fertilizer tube 20 is preferably made of a material which will withstand contact with chemicals normally used in farming operations and long periods of exposure to moisture such that it will not rust. The fertilizer tube 20 is preferably constructed of circular shaped tubular material, but is not limited to being only circular.

As best shown in FIGS. 1, 2, 4 and 6, the fertilizer tube 20 is comprised of an input opening 21 and a discharge opening 23 connected by a series of extensions (a first segment 22, a second segment 24, a third segment 26, and a fourth segment 28). The input opening 21 located at the beginning of the first segment 22 of the fertilizer tube 20 is preferably connected to a fertilizer 12 reservoir located on the implement via a hose 19 as shown in FIGS. 3 through 6.

Figure 3:
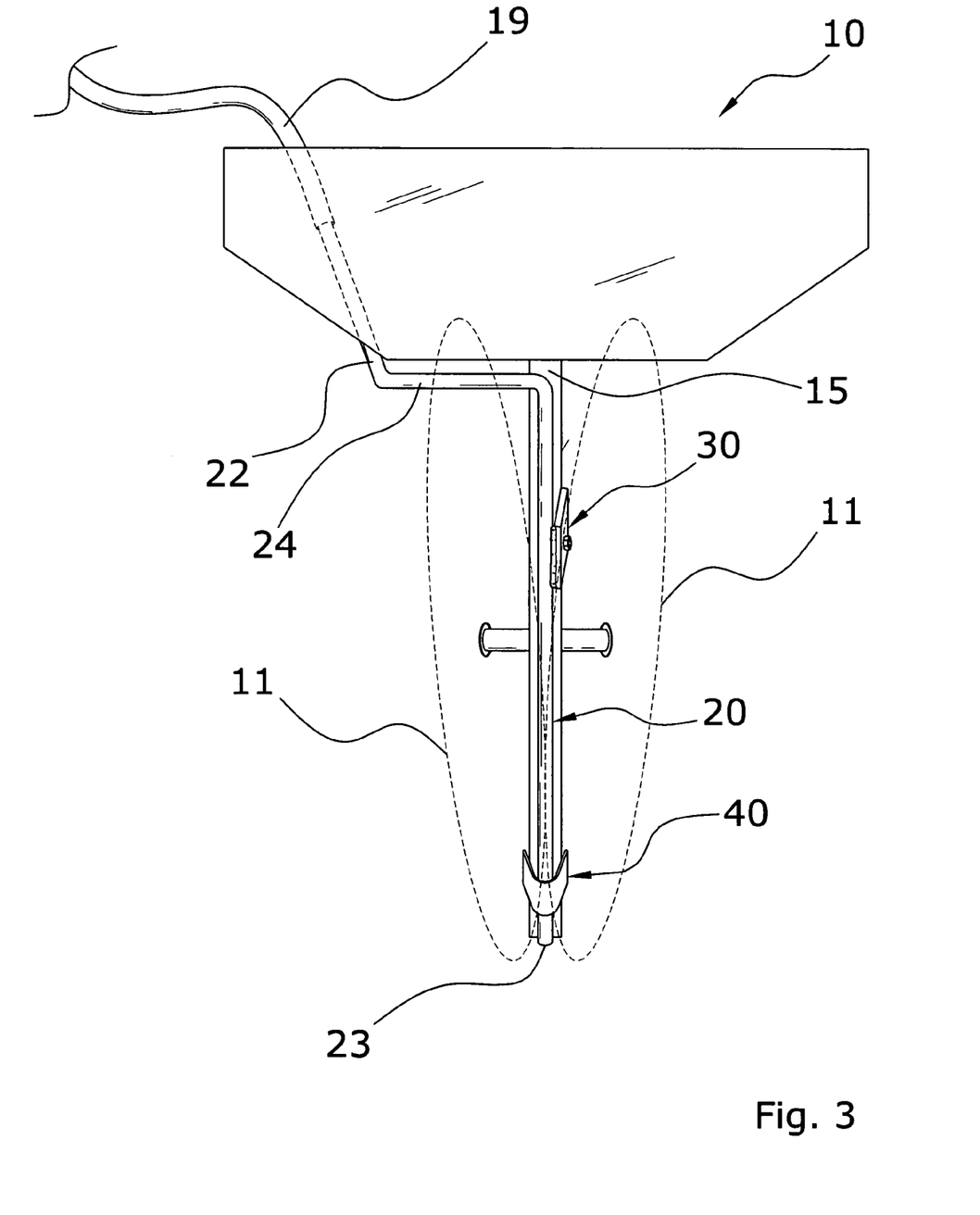
FIG. 3 is a front view of the present invention attached to a seed planter shank.

As shown in FIG. 3, the first segment 22, the input opening 21, and the hose 19 are maintained at a distance away from the shank 15 of the planter implement to eliminate any contact with the shank 15. Vibrational contact of the fertilizer tube 20 or the hose 19 against the shank 15 could result in a puncture of either the fertilizer tube 20 or the hose 19 and consequently the leak of fertilizer 12.

As best shown in FIG. 3, the discharge opening 23 located at the end of the fourth segment 28 of the fertilizer tube 20 is maintained in-line with the shank 15 by the centering bracket 40. The fertilizer tube 20 and centering bracket 40 are preferably welded together, but it can be appreciated by one skilled in the art that other fastening methods could be utilized. The discharge opening 23 is also preferably positioned slightly below the shank 15 so that the fertilizer 12 discharge does not come in contact with the shank 15 during the application process.

Figure 1:
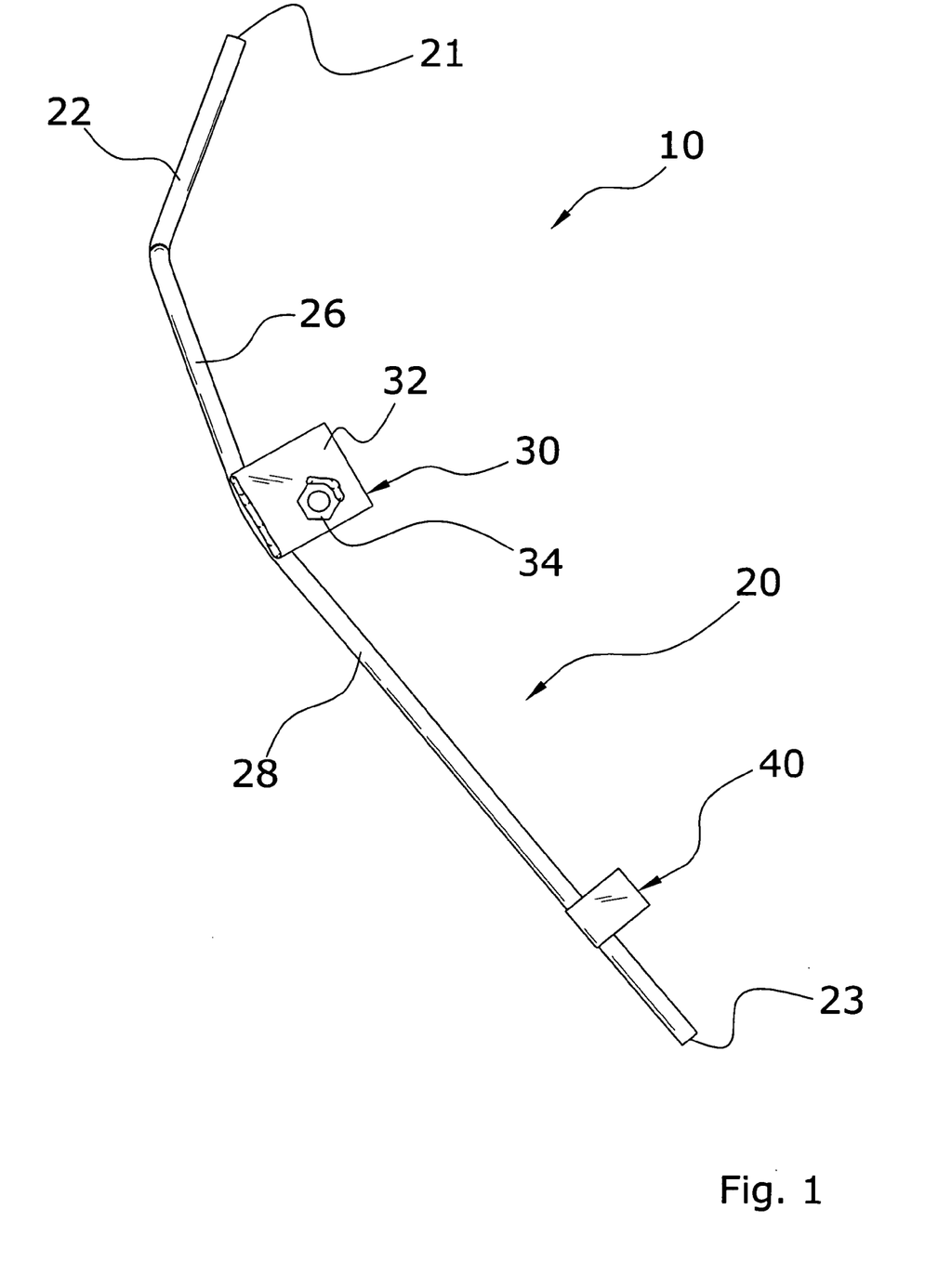
FIG. 1 is a side view of the present invention.
Figure 2:
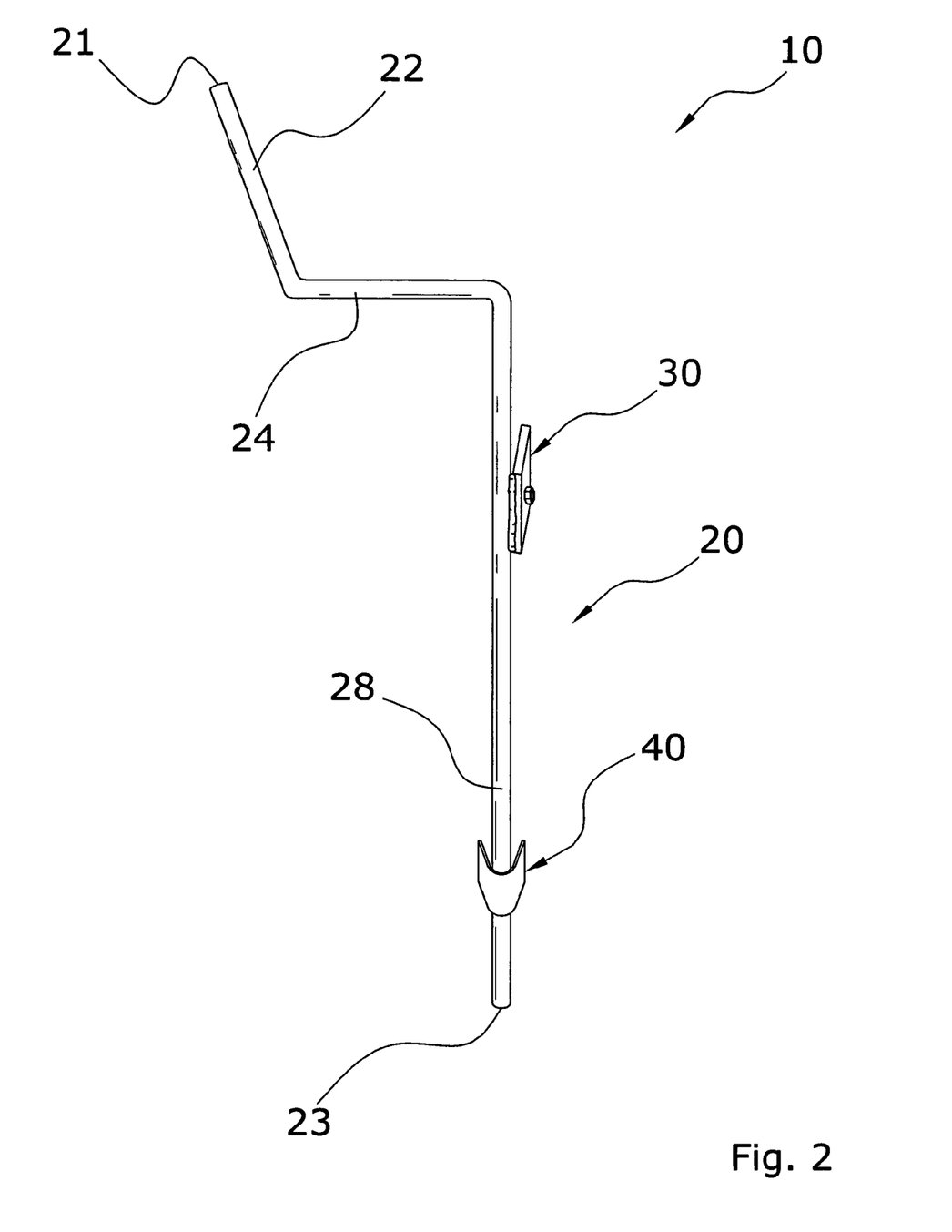
FIG. 2 is a front view of the present invention.
Figure 4:
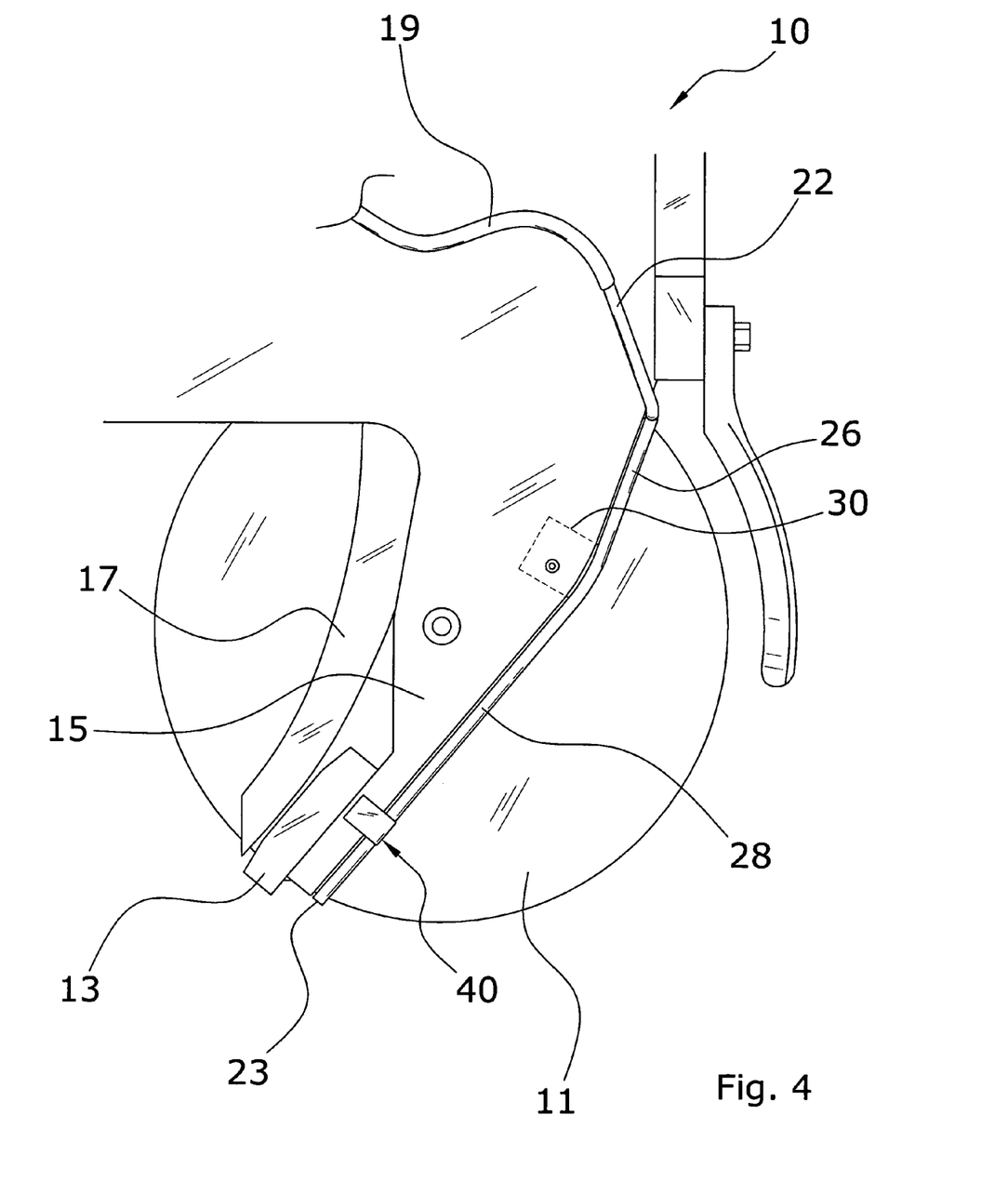
FIG. 4 is a side view of the present invention attached to a seed planter shank with one disk removed.
Figure 6:
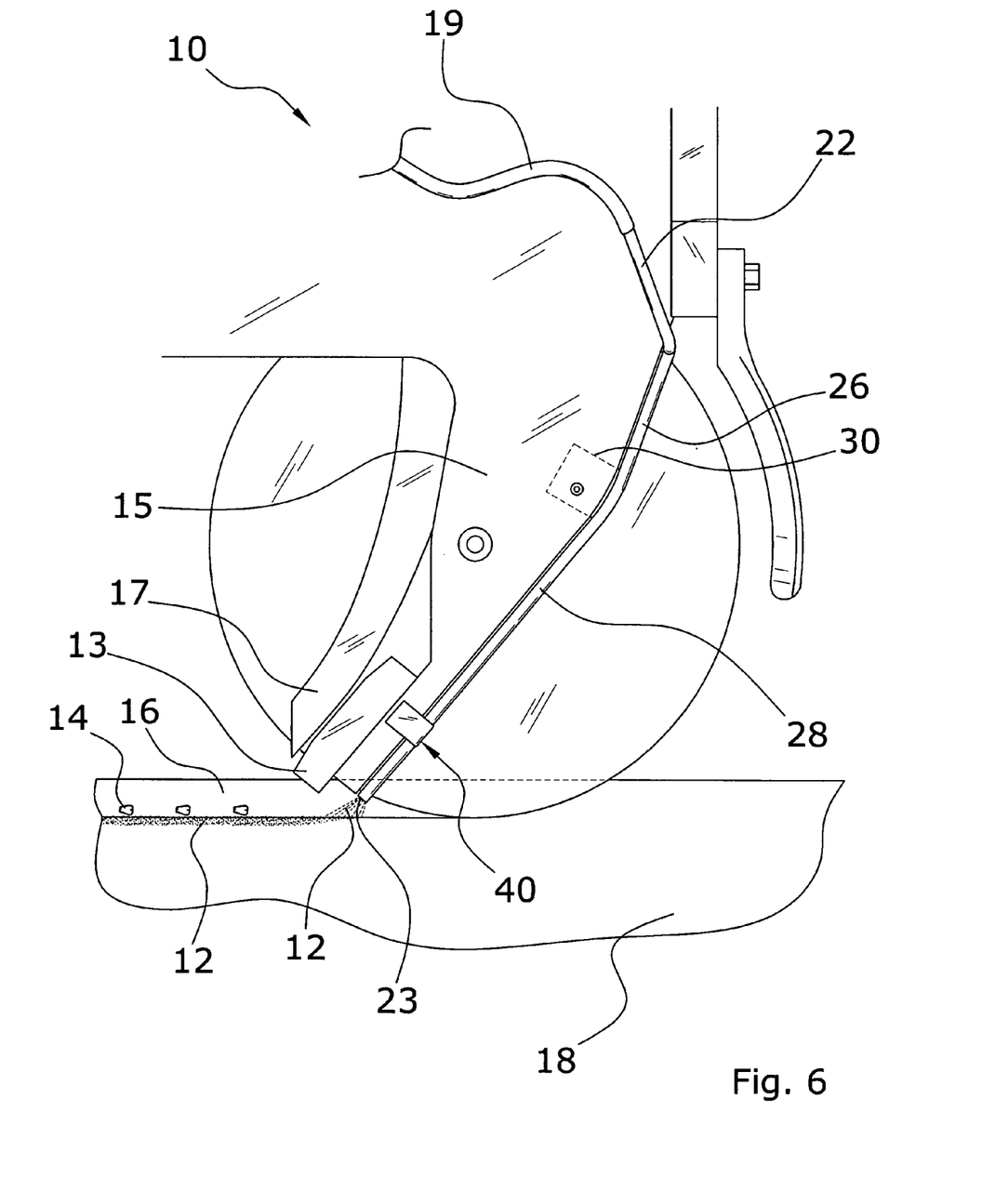
FIG. 6 is a side view of the present invention attached to a seed planter shank with one disk removed indicating the application of liquid fertilizer and seed planting.

The segments 22, 24, 26, 28 of the fertilizer tube 20 are preferably bent at preset angles in order to route around the shank 15 structure of the implement. The first segment 22 is bent up in relation to the second segment 24 preferably forming an angle of approximately 120 degrees. The second segment 24, as best shown in FIG. 2, extends horizontally to the third segment 26. The third segment 26 of the fertilizer tube 20 is positioned with a compound bend in relation to the first and second segments 22, 24. As shown in FIGS. 1, 2, 4 and 6, the second bend of the fertilizer tube 20 required for the third segment 26 is bent down preferably forming a second angle of approximately 135 degrees in relation to the first segment 22 and forming a third angle of approximately 90 degrees with the second segment 24. As shown in FIGS. 1, 4 and 6, the third bend of the fertilizer tube 20 required for the fourth segment 28 is bent up preferably forming an angle of approximately 170 degrees in relation to the third segment 26. The importance of the third bend between the third and fourth segments 26, 28 is that this bend must substantially match the structure of the shank 15 in order to obtain proper alignment and attachment to the shank 15.

C. Mounting Tab

The plate 32 of mounting tab 30 is preferably made of a rigid metal material that will not significantly distort when welded to or when assembled onto the shank 15 of a planter implement. The plate 32 of mounting tab 30 is preferably made of a material which will withstand contact with chemicals normally used in farming operations.

As shown in FIGS. 1 and 2, the mounting tab 30 is attached to the fertilizer tube 20, preferably welded to the third and fourth segments 26, 28 of the fertilizer tube 20. The mounting tab 30 is located substantially tangent to the fertilizer tube 20 and substantially tangent to the bend between the third and fourth segments 26, 28 as best shown in FIG. 1.

As shown in FIG. 1, a fastener 34 is attached to the plate 32 of the mounting tab 30. The fastener 34 is preferably welded to the plate 32, but it can be appreciated by one skilled in the art that other methods of attaching the fastener 34 to the plate 32 are possible. The fastener 34 is used to secure the selected hardware which attaches the liquid fertilizer application system 10 to the shank 15 of the planter implement. The hardware is preferably a socket head cap screw.

D. Centering Bracket

The centering bracket 40 is preferably made of a rigid metal material that will not significantly distort when welded to. The centering bracket 40 is preferably made of a material which will withstand contact with chemicals normally used in farming operations. The centering bracket 40 is formed into a V-shaped structure with a rounded bottom portion so the inside diameter of the rounded bottom matches the outside diameter of the fertilizer tube 20.

The centering bracket 40 is preferably welded to the fertilizer tube 20, however it can be appreciated that other methods of attachment could be used. As shown in FIG. 1, the bottom edge of the centering bracket 40 is located approximately 6 inches above and parallel to the discharge opening 23 located at the end of the fourth segment 28 of the fertilizer tube 20. The centering bracket 40 is located at the bottom of the fertilizer tube 20 to stabilize the fertilizer tube 20 by securing itself around the shank 15 of the planter implement.

E. Operation of the Invention

In use, a liquid fertilizer application system 10 is attached to each shank 15 of a planter implement. A liquid fertilizer application system 10 is procured by attaching both a mounting tab 30 and a centering bracket 40 to a fertilizer tube 20. The fertilizer tube 20 is attached in front of the shank 15 of the planter implement with the discharge opening located slightly below the shank 15.

To assemble each liquid fertilizer application system 10 to the planter implement, the mounting tab 30 attached to the fertilizer tube 20 is attached to each shank 15 by means of hardware (e.g. socket head cap screw) extending through a aperture located in the shank 15, securing at the fastener 34 attached to the mounting tab 30. The hardware is initially loosely attached to assure the centering bracket 40 is placed correctly around the shank 15. After the centering bracket 40 and fertilizer tube 20 are positioned correctly, the hardware is tightened to the mounting tab 30.

As best shown in FIGS. 3 through 6, during assembly of the liquid fertilizer application assembly 10 to the shank 15, the fertilizer tube 20 is routed around the shank 15 so as not to come into contact with the shank 15. This is repeated at each shank 15 on the planter implement.

Following the installation of each liquid fertilizer application system 10 to each shank 15 on the planter implement, a hose 19 is attached to each fertilizer tube 20 input opening 23 as shown in FIGS. 3 through 6. Each hose 19 comes from a fertilizer 12 reservoir or manifold and supplies the fertilizer 12 to each liquid fertilizer application system 10.

Figure 5:
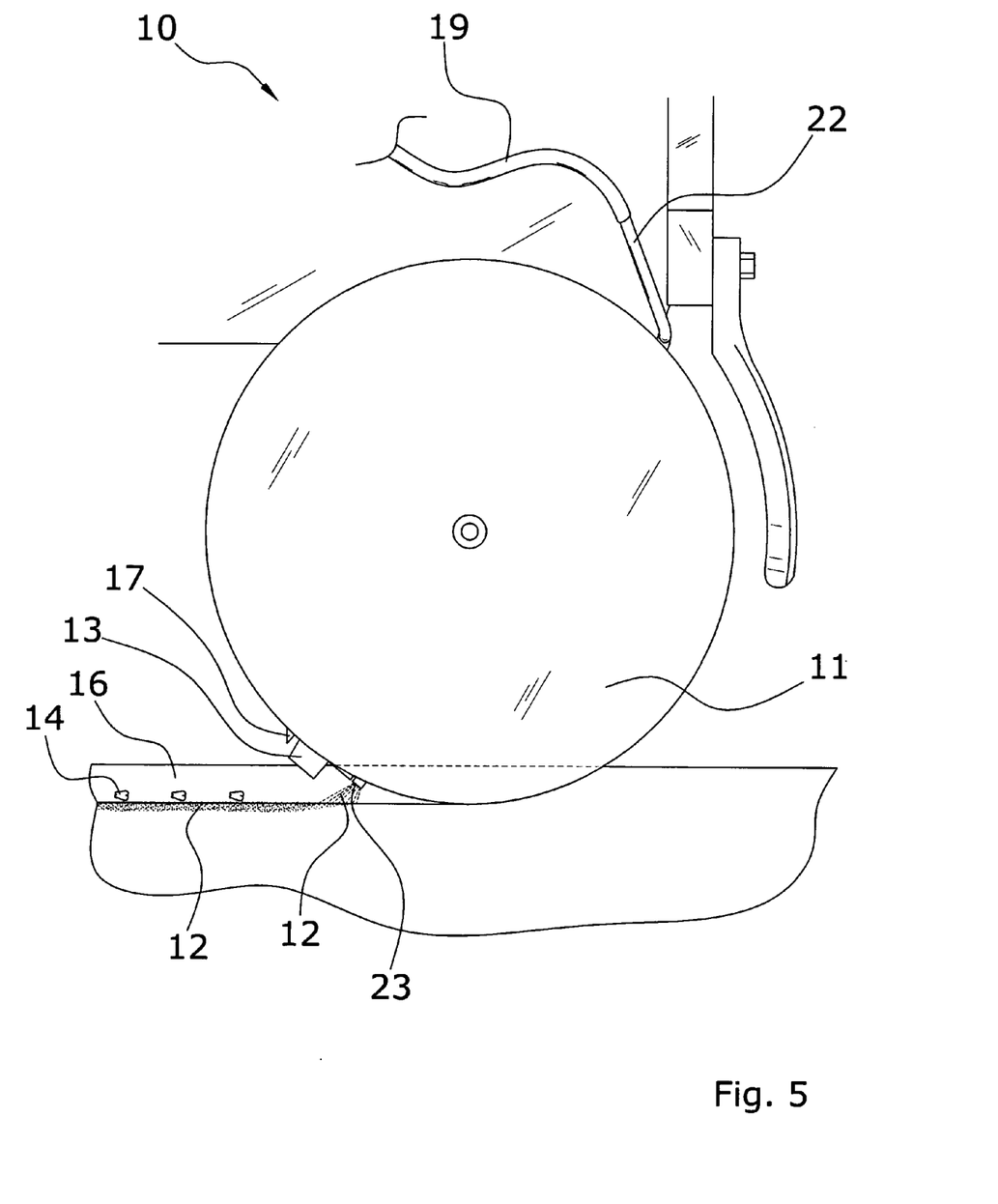
FIG. 5 is a side view of the present invention attached to a seed planter shank indicating the application of liquid fertilizer and seed planting.
Figure 7:
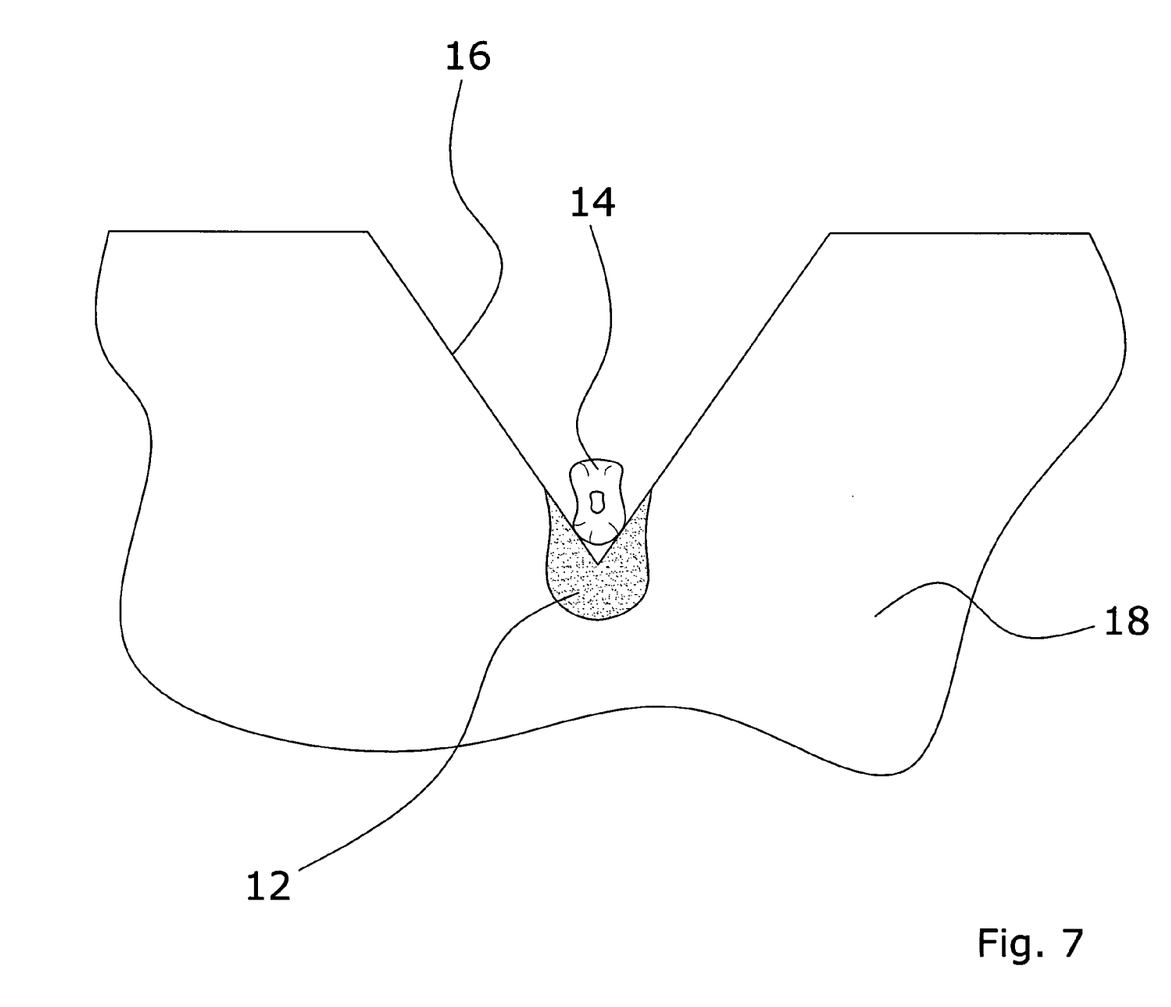
FIG. 7 is a front view of a seed located in a furrow with applied fertilizer.

As best shown in FIGS. 5 through 7, as the planter implement is pulled through the soil 18, the disk 11 creates a V-shaped furrow 16. This is a common seed preparation method used in the farming industry. The discharge opening 23 following the disk 11 then emits the fertilizer 12 onto the lower surface of the furrow 16 in preparation for the dispersment of the seed 14 as shown in FIG. 7. As shown in FIGS. 5 through 7, the seed 14 is placed above the fertilizer 12 within the furrow 16 and finally covered with soil 18.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A liquid fertilizer application system, comprising:
    a fertilizer tube including an input opening and a discharge opening, wherein said fertilizer tube is comprised of a continuous single structure;
    wherein said fertilizer tube is comprised of a rigid material;
    a mounting tab attached to a central location on said fertilizer tube, said mounting tab attachable to a shank of a planter; and
    a centering bracket attached to said fertilizer tube, said centering bracket securable about the shank of a planter;
    wherein said centering bracket is comprised of a V-shaped structure;
    wherein a central portion of said center bracket is rounded to conform to a shape of said fertilizer tube.

2. The liquid fertilizer application system of claim 1, wherein said fertilizer tube includes:
    a first segment originating at said input opening extending downward at a first angle;
    a second segment extending substantially horizontal;
    a third segment extending downward at both a second angle and a third angle; and
    a fourth segment extending further downward at a fourth angle, terminating at said discharge opening.

3. The liquid fertilizer application system of claim 2, wherein said both third angle and fourth angle substantially match the structure of said shank of said planter.

4. The liquid fertilizer application system of claim 2, wherein said first angle is approximately 120 degrees.

5. The liquid fertilizer application system of claim 2, wherein said second angle is approximately 135 degrees.

6. The liquid fertilizer application system of claim 2, wherein said third angle is approximately 90 degrees.

7. The liquid fertilizer application system of claim 2, wherein said fourth angle is approximately 170 degrees.

8. The liquid fertilizer application system of claim 2, wherein said attached mounting tab is welded to both said third segment and said fourth segment of said fertilizer tube.

9. The liquid fertilizer application system of claim 2, wherein said attached centering bracket is welded to said fourth segment of said fertilizer tube.

10. A liquid fertilizer application system, comprising:
    a fertilizer tube including an input opening and a discharge opening, wherein said fertilizer tube is comprised of:
        a first segment originating at said input opening extending downward at a first angle;
        a second segment extending substantially horizontal;
        a third segment extending downward at both a second angle and a third angle; and
        a fourth segment extending further downward at a fourth angle, terminating at said discharge opening;
    wherein said fertilizer tube is comprised of a continuous single structure;
    wherein said fertilizer tube is comprised of a rigid material;
    a mounting tab attached said third segment and fourth segment of said fertilizer tube, wherein said mounting tab is utilized for mounting said fertilizer tube to a shank of a planter; and
    a centering bracket attached to said fertilizer tube, wherein said centering bracket is utilized for stabilizing said fertilizer tube to the shank of the planter;
    wherein said centering bracket is comprised of a V-shaped structure;
    wherein a central portion of said center bracket is rounded to conform to a shape of said fertilizer tube.

11. The liquid fertilizer application system of claim 10, wherein said both third angle and fourth angle substantially match the structure of said shank of said planter.

12. The liquid fertilizer application system of claim 10, wherein said first angle is approximately 120 degrees.

13. The liquid fertilizer application system of claim 10, wherein said second angle is approximately 135 degrees.

14. The liquid fertilizer application system of claim 10, wherein said third angle is approximately 90 degrees.

15. The liquid fertilizer application system of claim 10, wherein said fourth angle is approximately 170 degrees.

16. The liquid fertilizer application system of claim 10, wherein said attached mounting tab is welded to both said third segment and said fourth segment of said fertilizer tube.

17. The liquid fertilizer application system of claim 10, wherein said attached centering bracket is welded to said fourth segment of said fertilizer tube.

18. A liquid fertilizer application system, comprising:
- a fertilizer tube including an input opening and a discharge opening, wherein said fertilizer tube is comprised of:
  - a first segment originating at said input opening extending downward at a first angle;
  - a second segment extending substantially horizontal;
  - a third segment extending downward at both a second angle and a third angle; and
  - a fourth segment extending further downward at a fourth angle, terminating at said discharge opening;
- wherein said fertilizer tube is comprised of a continuous single structure;
- wherein said fertilizer tube is comprised of a rigid material;
- a mounting tab attached said third segment and fourth segment of said fertilizer tube, wherein said mounting tab is utilized for mounting said fertilizer tube to a shank of a planter; and
- a centering bracket attached to said fertilizer tube, wherein said centering bracket is utilized for stabilizing said fertilizer tube to the shank of the planter;
- wherein said centering bracket is comprised of a V-shaped structure;
- wherein a central portion of said center bracket is rounded to conform to a shape of said fertilizer tube;
- wherein said both third angle and fourth angle substantially match the structure of said shank of said planter;
- wherein said first angle is approximately 120 degrees;
- wherein said second angle is approximately 135 degrees;
- wherein said third angle is approximately 90 degrees;
- wherein said fourth angle is approximately 170 degrees;
- wherein said attached mounting tab is welded to both said third segment and said fourth segment of said fertilizer tube;
- wherein said attached centering bracket is welded to said fourth segment of said fertilizer tube.

* * * * *